(12) United States Patent
Azevedo

(10) Patent No.: US 8,042,453 B2
(45) Date of Patent: Oct. 25, 2011

(54) PISTON WITH A SKIRT HAVING OIL FLOW SLOTS

(75) Inventor: Miguel Azevedo, Ann Arbor, MI (US)

(73) Assignee: Federal-Mogul Corporation, Southfield, MI (US)

( * ) Notice: Subject to any disclaimer, the term of this patent is extended or adjusted under 35 U.S.C. 154(b) by 580 days.

(21) Appl. No.: 12/190,256

(22) Filed: Aug. 12, 2008

(65) Prior Publication Data

US 2009/0044697 A1 Feb. 19, 2009

Related U.S. Application Data

(60) Provisional application No. 60/955,423, filed on Aug. 13, 2007.

(51) Int. Cl.
*F02F 3/00* (2006.01)
*F16J 1/04* (2006.01)

(52) U.S. Cl. ................. 92/237; 92/160; 92/235

(58) Field of Classification Search ............... 92/159, 92/160, 234, 235, 236, 237
See application file for complete search history.

(56) References Cited

U.S. PATENT DOCUMENTS

| | | | |
|---|---|---|---|
| 1,336,690 A | 4/1920 | Flammang | |
| 1,336,691 A | 4/1920 | Flammang | |
| 1,351,238 A | 8/1920 | Flammang | |
| 1,387,593 A * | 8/1921 | Crispin | 92/159 |
| 1,592,874 A | 7/1926 | Udale | |
| 1,719,092 A | 7/1929 | Taylor | |
| 1,758,444 A | 5/1930 | Ferdinand | |
| 1,759,110 A | 5/1930 | Graves | |
| 2,032,849 A | 3/1936 | Nelson | |
| 2,147,956 A | 2/1939 | Alexandrescu | |
| 3,307,456 A | 3/1967 | Etienne | |
| 4,354,426 A | 10/1982 | Steidle | |
| 4,674,399 A | 6/1987 | Bruni | |
| 4,691,622 A | 9/1987 | Sander et al. | |
| 4,702,151 A | 10/1987 | Munro et al. | |
| 4,704,949 A | 11/1987 | Foster | |
| 4,715,267 A | 12/1987 | Richmond | |
| 4,809,652 A | 3/1989 | Essig et al. | |
| 4,876,947 A | 10/1989 | Rhodes | |
| 4,989,559 A | 2/1991 | Fletcher-Jones | |

FOREIGN PATENT DOCUMENTS

| | | |
|---|---|---|
| DE | 3428490 A1 | 2/1986 |
| DE | 3437111 | 4/1986 |
| DE | 3437111 A1 | 4/1986 |
| EP | 030399 | 11/1980 |
| EP | 0030399 A1 | 6/1981 |
| EP | 0043147 A1 | 1/1982 |
| EP | 0050257 A1 | 4/1982 |
| FR | 661603 | 10/1928 |
| FR | 661603 A | 7/1929 |
| GB | 615274 | 1/1949 |
| GB | 615274 A | 1/1949 |
| JP | 10-122040 A | 5/1998 |
| JP | 04109066 A | 4/2004 |
| KR | 10-1997-0045043 A | 7/1997 |
| KR | 10-1999-0042865 A | 6/1999 |
| KR | 10-1999-0042869 A | 6/1999 |
| KR | 1019990042865 * | 6/1999 |

* cited by examiner

*Primary Examiner* — Thomas E Lazo
(74) *Attorney, Agent, or Firm* — Robert L. Stearns; Dickinson Wright PLLC

(57) ABSTRACT

A piston has a pair of diametrically opposite skirt portions each having an opening providing fluid communication between an outer surface of the skirt portions and an internal cavity. The openings provide the outer surfaces of the skirt portions with a circumferentially extending upper band portion above a horizontal plane extending through a pin bore axis and a circumferentially extending lower band portion below the horizontal plane.

14 Claims, 4 Drawing Sheets

PISTON WITH A SKIRT HAVING OIL FLOW SLOTS

CROSS-REFERENCE TO RELATED APPLICATION

This application claims the benefit of U.S. Provisional Application Ser. No. 60/955,423, filed Aug. 13, 2007, which is incorporated herein by reference in its entirety.

BACKGROUND OF THE INVENTION

1. Technical Field

This invention relates generally to internal combustion engines, and more particularly to pistons for heavy duty diesel engines.

2. Related Art

It is known that internal combustion engines, and particularly diesel engines, experience high oil consumption that leads to undesirable exhaust emissions. In addition, with the oil consumption comes carbon build-up on surfaces of pistons, particularly in the top land area, including in the annular ring grooves. As such, the ring movements can be restricted by the carbon build-up, thereby diminishing the effectiveness of the rings to properly seal the combustion gas and control oil consumption, thereby resulting in increased oil blow-by, reduced engine performance, reduced engine component life, and increased emissions.

In addition to the problems mentioned above, an additional known problem can result from a non-uniform, turbulent flow of oil within the cylinder over the path of piston reciprocation. Some of these additional problems include the onset of liner cavitation and increased friction between the piston and the cylinder liner. The liner cavitation is sensitive to the configuration of the piston, particularly where the piston is of a monobloc construction having a fixed skirt formed as one piece with the piston. The increased friction is sensitive to secondary movements of the piston, where, for the lack of guidance, the piston reciprocates cocked within the cylinder liner. Oil control loss can be traced to the high velocity of piston travel, generating a standing wave of oil. If such is the case in the upper portion of the skirt, it results in a phenomenon referred to as "oil flooding". As such, the majority of the oil is maintained toward the upper crown of the piston, and oil trickles into the ring belt area. In some cases, such as when the gas pressure gradient across the ring belt is not clearly defined, the first ring groove floods, whereupon the oil consumption control characteristic is lost. A secondary standing wave of oil forms at the upper edge of the first ring groove. Exposure of this oil to the flame front decomposes and carbonizes the oil in the standing wave, generating soot and formation of carbon deposits. As such, although it is desirable to maintain a continual supply of oil in the ring area of a piston, too much can be detrimental to the life of the engine and can also reduce the engine performance.

A piston manufactured according to the present invention and engine therewith overcomes or greatly minimizes the drawbacks resulting from at least those problems discussed above, thereby allowing diesel engines to operate at an increased performance level, while reducing their fuel consumption, oil consumption and exhaust emissions, besides prolonging their useful life.

SUMMARY OF THE INVENTION

A piston for an internal combustion engine constructed according to one aspect of the invention has an upper crown portion with a pair of pin bosses depending therefrom and being joined as one piece with a pair of laterally spaced skirt portions. The skirt portions each have a slot extending therethrough to provide fluid communication between an outer surface of the skirt portions and an inner cavity partially bounded by the skirt portions. The slots have upper and lower edges extending generally transverse to the direction of piston reciprocation and sides extending between the upper and lower edges. The upper and lower edges have a contoured, proprietary shape to promote laminar and generally uniform oil flow and distribution over an outer surface of the piston over a cycle of the piston. The contoured shaped shape thereby directs at least some oil flow into the cavity of the piston, while also maintaining a desired hydrodynamic oil film external to the piston.

According to one aspect of the invention, each of the slots have a length and width that occupy between about 20-80 percent of the respective skirt area.

According to another aspect of the invention, the upper and lower edges are contoured generally the same.

According to another aspect of the invention, the upper and lower edges are contoured differently.

According to another aspect of the invention, the upper and lower edges are contoured having a linear chamfer surface extending from an outer surface of the skirt to an inner surface of the slot.

According to another aspect of the invention, the upper and lower edges are contoured having a non-linear chamfer surface extending from an outer surface of the skirt to an inner surface of the slot. The non-linear chamfer can be formed of any suitable contour, including a parabolic shape or other desirable polynomial shaped configurations.

Pistons manufactured in accordance with the present invention improve oil flow over a complete cycle of the piston, reduce dynamic viscous friction over the cycle of the piston, improve the guidance of the piston throughout its complete cycle, reduce cylinder liner cavitation, reduce piston viscous friction loss, reduce carbon build-up in ring grooves of the piston and on piston rings with the grooves, improve the movement of the piston rings, reduce oil consumption and formed carbon adhered to the top land, therefore reducing bore polishing typically caused by carbon build-up, reduce exhaust emissions, and overall improve the running performance and life of the engine. The sum of these beneficial effects reduces engine fuel consumption and promotes more miles-to-gallon.

BRIEF DESCRIPTION OF THE DRAWINGS

These and other aspects, features and advantages of the invention will become readily apparent to those skilled in the art in view of the following detailed description of the presently preferred embodiments and best mode, appended claims, and accompanying drawings, in which:

DETAILED DESCRIPTION OF PRESENTLY PREFERRED EMBODIMENTS

Figure 1:
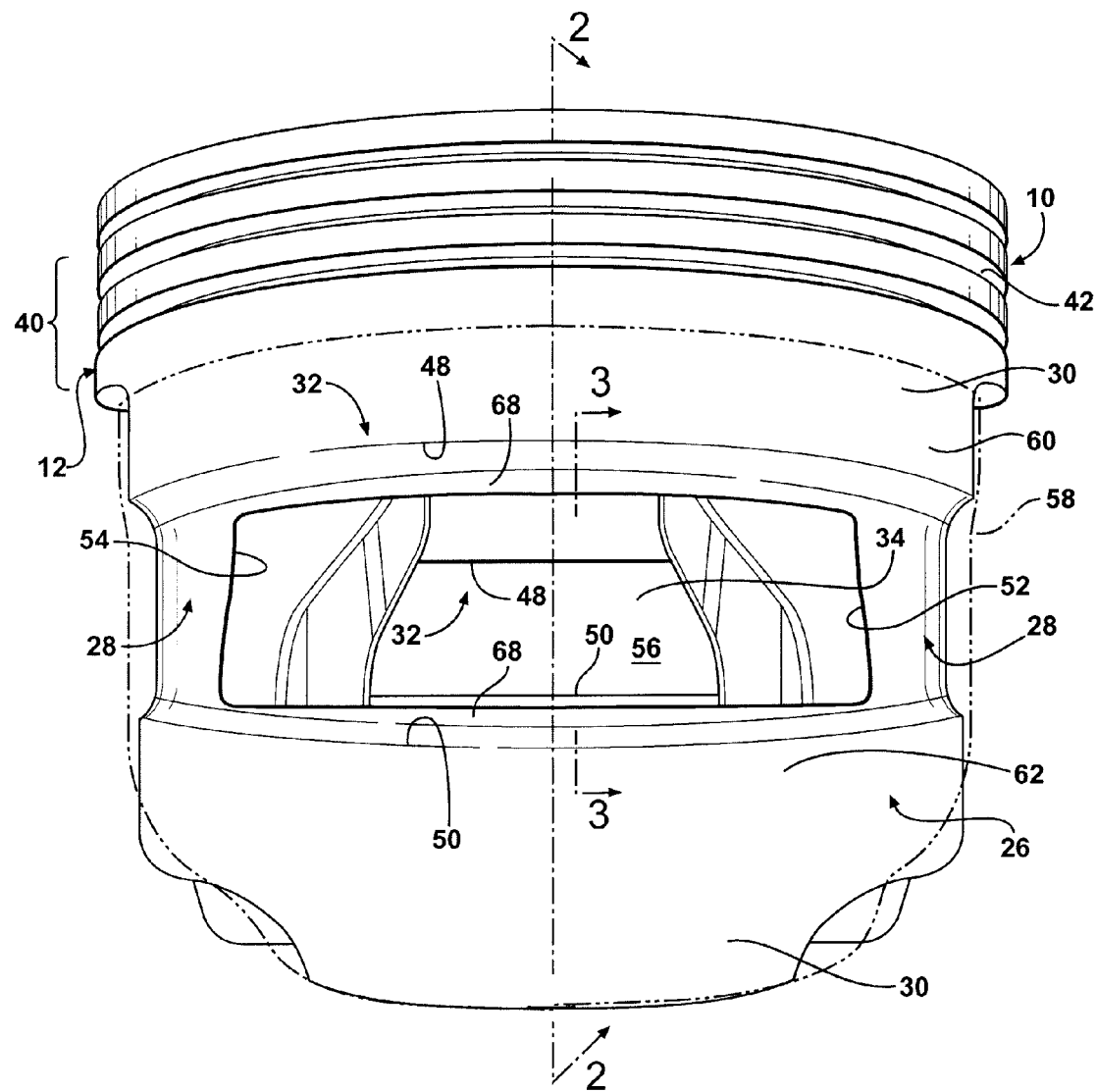
FIG. 1 is a partial perspective view of a piston construction according to presently preferred embodiment of the invention.
Figure 2:
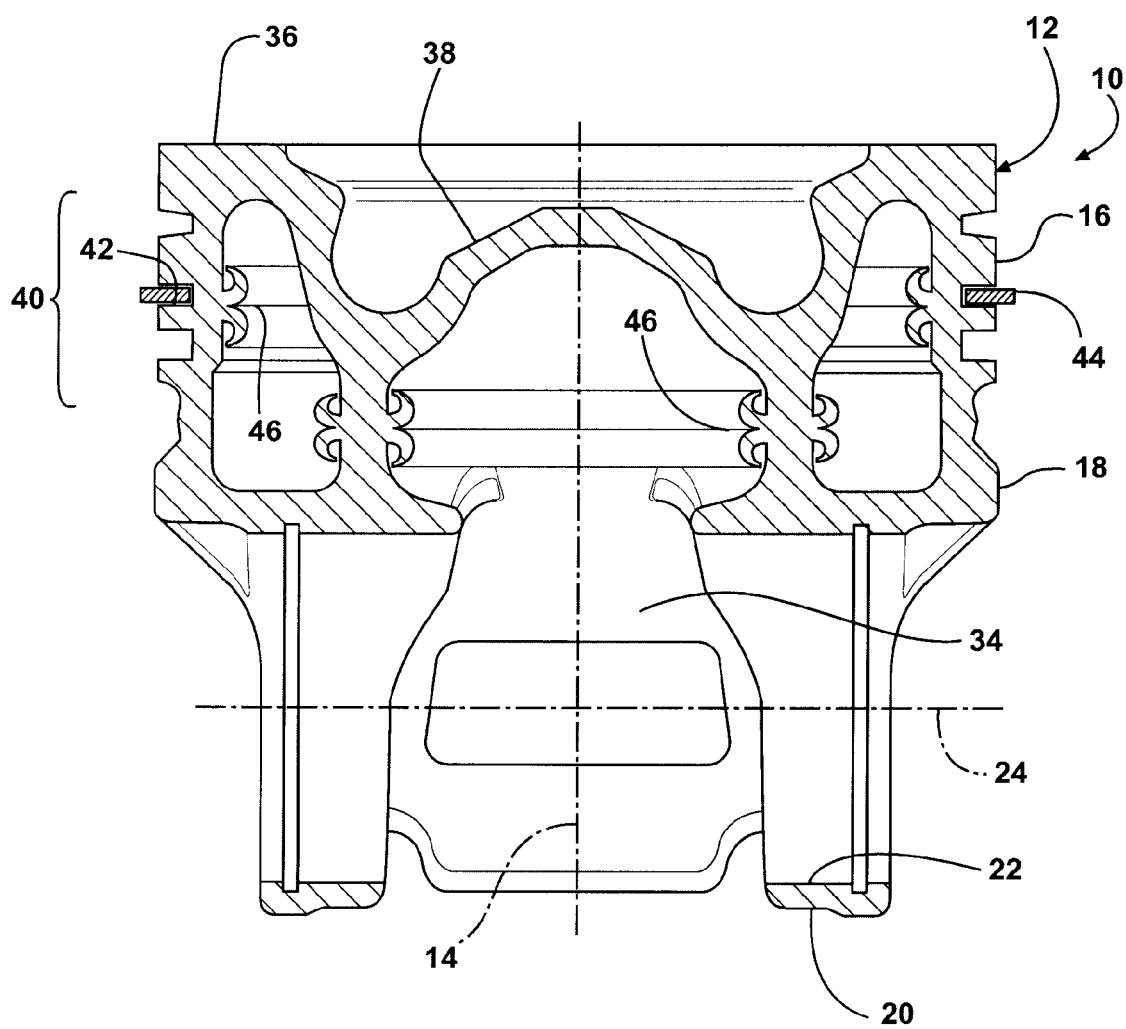
FIG. 2 is a cross-sectional view taken generally along the line 2-2 of FIG. 1.

Referring in more detail to the drawings, FIGS. 1 and 2 illustrate a piston 10 constructed according to one presently preferred embodiment of the invention for reciprocating movement in a cylinder bore (not shown) of an internal combustion engine, such as a diesel engine. The piston 10 has a body 12, either cast or forged, or by any other process of manufacture, extending along a central axis 14 along which the piston 10 reciprocates in the cylinder bore. The body 12 is represented, by way of example and without limitation, as having an upper crown 16 joined to a lower crown 18 having a pair of pin bosses 20 depending from the upper crown to provide laterally spaced pin bores 22 aligned along a pin bore axis 24 that extends generally transverse to the central axis 14. By way of example and without limitation, the pin bosses 20 are joined to laterally spaced skirt portions 26 via strut portions 28, thereby forming a so called "monobloc" piston wherein the skirt portions 26 are formed as one piece material with the pin bosses 20. The skirt portions 26 are diametrically spaced from one another across the pin bore axis 24 and have convex outer surfaces 30 contoured for cooperation with the cylinder bore to maintain the piston 10 in a desired orientation as it reciprocates through the cylinder bore. During reciprocation, a hydrodynamic oil film is developed and maintained between the outer surfaces 30 of the skirt portions 26 and the wall of the cylinder bore to minimize dynamic friction therebetween. To facilitate maintaining the desired hydrodynamic oil film thickness and distribution of oil across the outer surfaces 30 of the skirt portions 30, through slots or openings 32 are formed in the skirt portions 26. The openings 32 can be formed having a variety of shapes and sizes, such as in a machining, punch, forging or casting operation, for example, or any other process as desired for the intended application to provide the desired fluid communication of oil between the outer surfaces 30 of the skirt portions 26 and a cavity 34 formed between the skirt portions 26.

The upper crown 16 of the piston 10 is represented here as having an upper surface 36 with a combustion bowl 38 recessed therein to provide a desired gas flow with the cylinder bore. An outer wall or ring belt 40 extends downwardly from the upper surface 36, with at least one annular ring groove 42 being formed in the ring belt 40 for floating receipt of a piston ring 44. The piston ring 44, when properly functioning in its free floating state, facilitates guiding the piston 10 during reciprocation within the cylinder bore, while also sealing combustion gases and inhibiting the passage of oil upwardly thereby from below the piston body 12.

The lower crown 18 is represented here as being formed separately from the upper crown 16, such as in a forging process, and then joined thereto, wherein the upper and lower crowns 16, 18 can be joined together by a weld joint 46, for example. It should be recognized that a piston 10 constructed in accordance with the invention could have an upper and lower crown portions formed otherwise, such as in a casting process, for example, and that they could be joined using mechanisms other than a weld joint.

Figure 3:
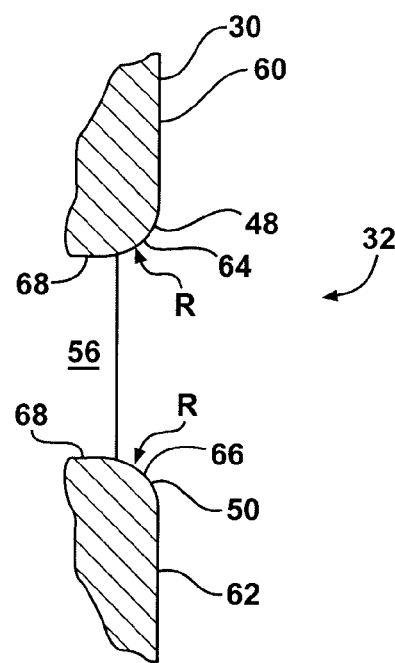
FIG. 3 is a schematic fragmentary cross-sectional view taken generally along the line 3-3 showing a slot in a skirt of the piston in accordance with one presently preferred embodiment of the invention.

As shown in FIGS. 1 and 3, the openings 32 in the skirt portions 26 have upper and lower edges 48, 50, respectively, extending generally parallel to a horizontal plane extending through the pin bore axis 24 and generally transverse to the central axis 14 and sides 52, 54 extending generally transverse to the horizontal plane between the upper and lower edges 48, 50. The upper and lower edges 48, 50 correspond generally to a length of the opening 32, while the sides 52, 54 correspond generally to a width of the opening 32, although the maximum widths can extend or bow outwardly from the sides 52, 54. The relation of the length to the width of the opening 32 is such that the length is greater than the width, however, the aspect ratio of length-to-width is relatively low. As such, the openings 32 are generally wide. Each of the openings 32 provides an open space 56 occupying between about 20-80 percent of the respective total area of the respective skirt portion 26, wherein the individual skirt portion total area is bordered generally by an outer perimeter 58 (FIG. 1) of the skirt outer surface 30. Accordingly, the area of the skirt outer surface 30 capable of being moved into frictional engagement with the cylinder bore is reduced to between about 20-80 percent of the total area of the skirt portion 26, depending on the relative size of the slot 32 to the total area of the skirt portion 26. As such, the potential dynamic frictional losses resulting between the skirt portions 26 and the cylinder wall is reduced, in addition to significantly reducing the weight of the piston. It has been discovered that an opening forming about a 40 percent reduction in the skirt outer surface area results in about an 80 percent reduction in friction from the maximum practically achievable.

The openings 32 extend sufficiently across the skirt portions 26 to form upper and lower band sections 60, 62. The upper and lower band sections 60, 62 can be provided having a generally symmetrical shape, but non-symmetrical shapes are also contemplated, depending on the intended application. Included herein is the aspect that openings can be configured in such a way as to provide discrete bearing "pads", i.e., distinct individually isolated load bearing areas. Much of the present discussion about approach and trailing angles to the skirt band sections also apply rigorously, possibly more so, to these discrete pads. This latter configuration is not depicted by drawings, but is an aspect considered to within the scope of this invention.

As best shown in FIG. 3, the upper and lower edges 48, 50 have respective smooth rounded, and referred to hereafter as chamfered surfaces 64, 66, extending from the outer surface 30 of the skirt portion 26 to an inner surface 68 of the opening 32. The upper and lower chamfered surfaces 64, 66 are shown here, by way of example, as being generally symmetrical to one another and having a corner radius (R) without sharp corners. It is believed that a parabolic radius corresponding to a formula $y=ax^2$ is desirable, as this formula has a second derivative of $d^2y/dx^2=2a$, which provides constant acceleration of the fluid film. As such, by having constant acceleration, laminar flow of the oil is promoted, thereby resulting in reduced turbulence, and thus, reduced cavitation. However, it should be recognized that other polynomial shaped chamfered surface configurations are contemplated herein, including higher order polynomials, for example.

During reciprocation, the smooth chamfered surfaces 64, 66 direct oil both radially inwardly into the openings 32 and into the cavity 34, while also maintaining a sufficient amount of oil between the outer surfaces 30 of the upper and lower band sections 60, 62 and the cylinder bore. During the down stroke, the upper chamfered surface 64 promotes the ingress of oil through the openings 32 and into the cavity 34, and conversely, during the upstroke, the lower chamfered surface 66 promotes the ingress of oil though the openings 32 and into the cavity 34. Accordingly, by directing oil inwardly into the openings 32, the hydraulic pressure gradient is perfectly determined over both bands 60, 62. Thus, the phenomenon of forming a standing wave of oil adjacent the ring belt 40 between the down stoke and upstroke is prevented, thereby eliminating the oil flooding phenomenon in the region of the ring belt 40. As such, carbon deposits in the area of the ring belt 40, and particularly on the piston ring 44 and in the piston ring groove 42 is avoided. As such, the piston ring 44 is able to maintain a free floating motion within the ring groove 42 to facilitate to facilitate its sealing function within the cylinder bore, while also preventing an oil migration condition to the top land.

Another aspect of this invention, with the bearing surfaces shaped as bands or discreet pads, is that the secondary rocking motion of pistons in the thrust/non-thrust plane permitted by the traditional curved, continuous skirt profile, no longer applies. In fact, the present skirt design can be shaped to effectively present two, three or more focal bearing locations to the parent liner in contact. Limiting to two or three focal points, for discussion purposes only and without limitation, it can be visualized that a line or triangular support is thus provided. The outcome is that the piston is better guided within the confines of the cylinder bore, reciprocating in a concentric fashion. This configuration is conducive to less Coulomb friction and more of a fully hydrodynamic lubrication and a stable reciprocating regime. A corollary to the exposed is that impacts are thus avoided and mechanical excitation of the liner minimized. Cavitation on the coolant side of the liner is thus prevented to a large extent.

Figure 4:
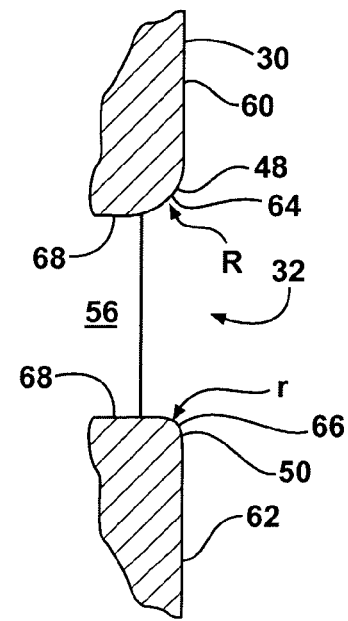
FIG. 4 is a view similar to FIG. 3 showing a slot in the skirt of the piston in accordance with another presently preferred embodiment of the invention.
Figure 5:
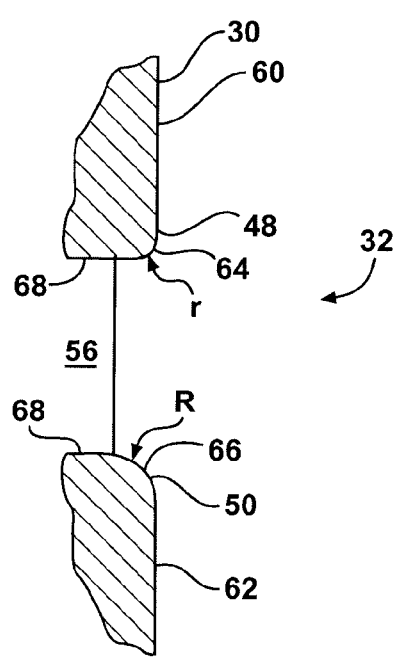
FIG. 5 is a view similar to FIG. 3 showing a slot in the skirt of the piston in accordance with yet another presently preferred embodiment of the invention.

As shown in FIG. 4, the openings 32 can be formed having smooth chamfered surfaces that are non-symmetrical to one another. In this embodiment, the upper chamfered surface 64 has a greater radius of curvature (R), or more gradual polynomial curve in relation to the radius of curvature (r) of the lower chamfered surface 66. Conversely, as shown in FIG. 5, the upper chamfered surface 64 has a reduced radius of curvature (r), or less gradual polynomial curve in relation to the radius of curvature (R) of the lower chamfered surface 66. Accordingly, the openings 32 can be constructed having different configurations, as best suited for the piston application.

Figure 6:
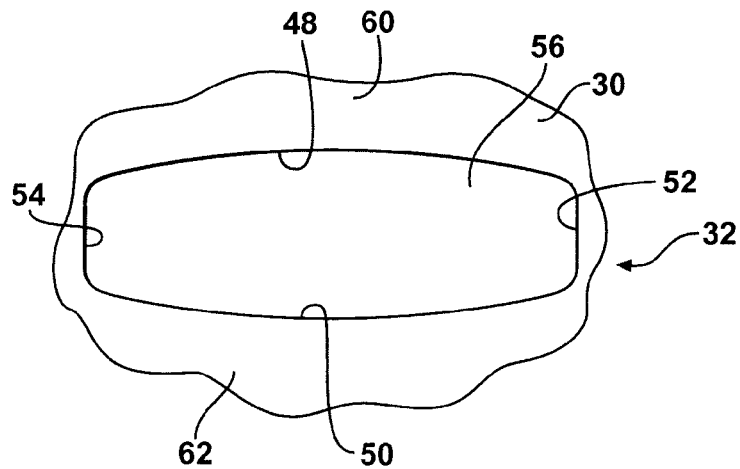
FIG. 6 is a schematic fragmentary side view of the skirt looking into a slot constructed in accordance with one presently preferred embodiment of the invention.
Figure 7:
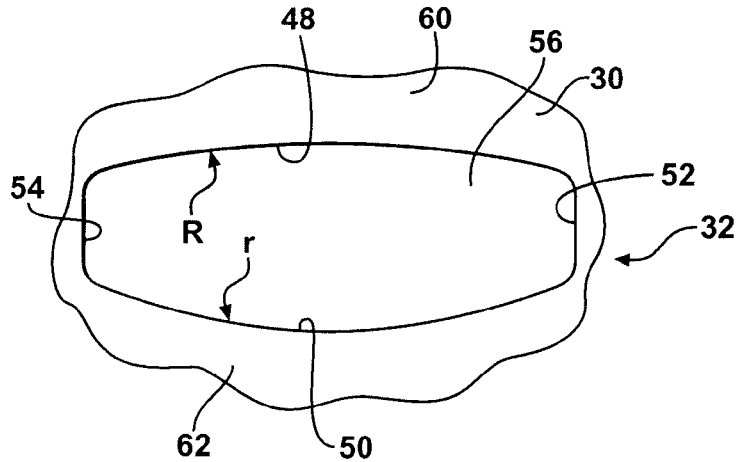
FIG. 7 is a view similar to FIG. 6 showing a slot constructed in accordance with another presently preferred embodiment of the invention.
Figure 8:
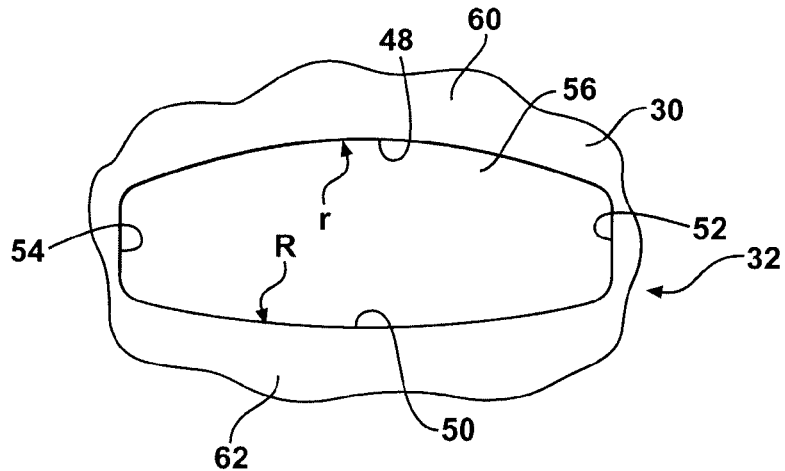
FIG. 8 is a view similar to FIG. 6 showing a slot constructed in accordance with another presently preferred embodiment of the invention.

In addition, as shown in FIG. 6, the openings 32 can be constructed having a generally symmetrical shape along the lengths of the upper and lower edges 48, 50. Otherwise, as shown in FIGS. 7 and 8, the upper and lower edges 48, 50 can be constructed having differing, non-symmetrical shapes. For example, FIG. 7 shows an embodiment of an opening 32 having an upper edge 48 with an increased radius of curvature (R) along its length in relation to the radius of curvature (r) of the lower edge 50. Conversely, FIG. 8 shows an embodiment of an opening 32 having an upper edge 48 with a reduced radius of curvature (r) along its length in relation to the radius of curvature (R) of the lower edge 50. Accordingly, it should be recognized that the openings 32 can be constructed having a multitude of configurations to attain the desired radially inwardly flow of oil through the slots 32 and into the cavity 34, while also maintaining the desired thickness of the hydrodynamic oil layer between the upper and lower band sections 60, 62 and the cylinder bore wall. The same considerations apply if discreet bearing pads are used in lieu of bands. It should also be recognized that various permutations of the discussed embodiments may be configured, such that the radius of chamfered surfaces 64, 66 of the upper and lower edges 48, 50 and the radius of curvature (r,R) of the upper and lower edges 48, 50 along their lengths can be adjusted and combined, as necessary.

Obviously, many modifications and variations of the present invention are possible in light of the above teachings. It is, therefore, to be understood that within the scope of the appended claims, the invention may be practiced otherwise than as specifically described.

What is claimed is:

1. A piston, comprising:
a piston body having an upper crown portion;
a pair of pin bosses depending from said upper crown and having pin bores aligned with one another along a pin bore axis; and
a pair of skirt portions arranged on opposite sides of said pin bore axis, each of said skirt portions having a convex outer surface and an inner surface facing a cavity with an opening providing fluid communication between said outer surface and said cavity, said openings providing said convex outer surfaces of said skirt portions with a circumferentially extending upper band portion above a horizontal plane extending through said pin bore axis and a circumferentially extending convex lower band portion below said horizontal plane, said openings having peripheral upper and lower edges and peripheral side edges, at least one of said upper and lower edges having a parabolic radius of curvature extending from said convex outer surface inwardly toward said cavity.

2. The piston of claim 1 wherein each of said openings occupy between about 20 to 80 percent of the area of said outer surface of their respective skirt portion.

3. The piston of claim 1 wherein said upper band portion and said lower band portion occupy between about 20 to 80 percent of the total area of said outer surface of their respective skirt portion.

4. The piston of claim 1 wherein said peripheral upper and lower edges extend generally parallel to said horizontal plane and said peripheral side edges extend generally transverse to said horizontal plane between said upper and lower edges.

5. The piston of claim 4 wherein said upper and lower edges have substantially the same radius of curvature extending from said convex outer surfaces of said skirt portions inwardly toward said cavity.

6. The piston of claim 5 wherein said upper and lower edges have substantially the same radius of curvature extending between said side edges.

7. The piston of claim 1 wherein said skirt portions are constructed as one piece of material with said pin bosses.

8. The piston of claim 7 wherein said piston is a monobloc piston.

9. The piston of claim 1 wherein each of said upper and lower edges have a parabolic radius of curvature extending from said convex outer surface inwardly toward said cavity.

10. A piston comprising:
a piston body having an upper crown portion;
a pair of pin bosses depending from said upper crown and having pin bores aligned with one another along a pin bore axis; and
a pair of skirt portions arranged on opposite sides of said pin bore axis, each of said skirt portions having a convex outer surface and an inner surface facing a cavity with an opening providing fluid communication between said outer surface and said cavity, said openings providing said convex outer surfaces of said skirt portions with a circumferentially extending upper band portion above a horizontal plane extending through said pin bore axis and a circumferentially extending convex lower band portion below said horizontal plane, said openings having peripheral upper and lower edges and peripheral side edges, wherein said upper and lower edges have different radii of curvature extending between said side edges.

11. A piston comprising:

a piston body having an upper crown portion;

a pair of pin bosses depending from said upper crown and having pin bores aligned with one another along a pin bore axis; and a pair of skirt portions arranged on opposite sides of said pin bore axis, each of said skirt portions having a convex outer surface and an inner surface facing a cavity with an opening providing fluid communication between said outer surface and said cavity, said openings providing said convex outer surfaces of said skirt portions with a circumferentially extending upper band portion above a horizontal plane extending through said pin bore axis and a circumferentially extending convex lower band portion below said horizontal plane, said openings having peripheral upper and lower edges and peripheral side edges, wherein said upper and lower edges have different radii of curvature extending from said convex outer surfaces of said skirt portions inwardly toward said cavity.

12. The piston of claim 11 wherein at least one of said radii of curvature is parabolic.

13. The piston of claim 11 wherein said upper and lower edges have substantially the same radius of curvature extending between said side edges.

14. The piston of claim 11 wherein said upper and lower edges have different radii of curvature extending between said side edges.

* * * * *